3,085,859
MERCURY RECOVERY AND REMOVAL

Herman G. Scholten and Glenn E. Prielipp, Midland, Mich., assignors to The Dow Chemical Company, Midland, Mich., a corporation of Delaware
No Drawing. Filed Sept. 1, 1960, Ser. No. 53,344
3 Claims. (Cl. 23—134)

This application is a continuation-in-part of our copending application Serial Number 839,579, filed September 14, 1959, now abandoned.

The present invention relates to a process for the recovery of mercury, and more particularly, to a method of recovering mercury from brine effluent from mercury cathode electrolytic cells.

The mercury cathode electrolytic cells are constructed with a relatively small gap between a fixed anode and a steel plate or other current conducting material. In the operation of these cells, saturated sodium chloride or potassium chloride brine and mercury are passed through this gap during the electrolysis. The mercury upon entering the cell spreads over the steel plate or other conducting material and acts as a cathode for the cell. After passing the brine once through the cell, the brine discharged from the cell is dechlorinated by air stripping or other means, resaturated with salt, and recycled through the cell. When a sodium chloride brine is used, the brine generally will contain around 300 grams of sodium chloride per liter, while for potassium chloride solution, the concentration may be up to around 350 grams of potassium chloride per liter. In passing through the cell the chloride concentration of the brine is seldom reduced below about 20 percent of the initial concentration. Thus, the brine discharge from the cell is still relatively saturated.

While the mercury cathode cells have many advantages over other conventional cells, a small but significant amount of mercury is lost in the process. A major portion of the mercury loss results from the chlorination of the mercury to a soluble mercury salt which dissolves in the brine as it passes through the cell, and is lost in the resaturation step of the process. The brine leaving the cell often contains as much as 50 parts of mercury per million parts of brine and in some cases a considerably greater amount. This loss of mercury, while small per pass, becomes considerable when a battery of cells is operated over an extended period of time.

It is therefore, a principal object of this invention to provide a process for the recovery of mercury from the brine discharged from mercury cathode cells. A further object is to recover the mercury by an economical method which will not contaminate the brine and make it unsuitable for further electrolysis.

The above and additional objects may be accomplished by passing the brine effluent, containing dissolved mercury salts, through a strongly basic anion exchange resin; washing the basic anion exchange resin with an excess of an aqueous sulfide solution; and separating the mercury from the aqeuous sulfide solution.

The term "mercury sulfide," as used herein, means mercuric sulfide, mercurous sulfide, or a mixture thereof. The term "brine," as used herein, means natural or artificial aqueous solutions of sodium or potassium halides.

The term "strongly basic anion exchange resin," as used in the sepcification and claims hereinafter, means any resinous, insoluble quaternary ammonium composition, and preferably those compositions prepared by the amination of a haloalkylated copolymer with a tertiary amine, such as trimethyl amine, triethyl and tripropyl amines, dimethyl ethyl amine, diethyl cyclohexyl amine, tricyclohexyl amine, triphenyl amine, diphenyl ethyl amine, benzyl dimethyl amine, and the like as well as those quaternary ammonium polymeric compositions, containing one or more quaternary ammonium substituents per molecular unit, described in U.S. Patent 2,801,224. Illustrative of some of such strongly basic anion exchange resins, presently commercially produced, are the following two types of recurring quaternary ammonium units:

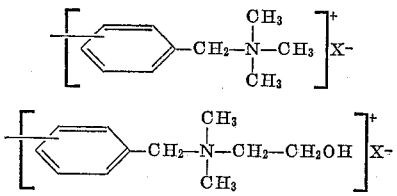

(where X is any negatively charged atom or radical such as OH⁻, Cl⁻, Br⁻, I⁻, NO₃⁻ or the like)

While it is known that mercury salts may be removed from brine solutions, it is unexpected that strongly basic anion exchange resins will selectively isolate mercury salts without deleterious effects toward either the mercury or brine, this selective isolation, as opposed to precipitation or flocculation methods, has the distinct advantage of being readily adaptable to high speed, large volume, continuous reaction sequences. Since the isolation is carried out from relatively saturated brine solutions, the selectivity of the basic anion exchange resins toward only mercury salts, as previously outlined, is striking.

To obtain this isolation of mercury salts, it is necessary to allow the brine solution, with mercury salts dissolved therein, to pass through a strongly basic anion exchange resin of at least one-half the milliequivalent of mercury present. Generally, one-half milliequivalent to one milliequivalent, resin to mercury, is utilized; however, an excess of strongly basic anion exchange resin is not deleterious, but only unessential and impractical. Should less than one-half milliequivalent of resin to mercury be utilized, an incomplete isolation of mercury may, and often will, result.

To remove the exchanged mercury salts from the strongly basic anion exchange resin, it is intended that an aqueous sulfide solution should be utilized. Any water soluble sulfide may be used. Especially effective are the alkali metal sulfides such as sodium sulfide, potassium sulfide, lithium sulfide, cesium sulfide, and rubidium sulfide. Hydrogen sulfide or ammonium sulfide may also be utilized, if desired. Generally the sulfide is employed as a ½₀ to 3 normal solution. Although a stoichiometric amount of the sulfide may be utilized to react with the exchanged mercury salt, an excess in the range of 100 to 400 percent is preferably employed. With an amount of sulfide greater than 100 percent excess, the mercury sulfide produced is soluble in the aqueous sulfide solution and easily washed from the strongly basic anion exchange resin. A greater excess of sulfide is not deleterious, but is of no added advantage since the volume of sulfide becomes too large and unwieldy to be economically feasible.

Thus it is envisioned that the mercury salts in brine may be exchanged by utilization of a strongly basic anion exchange resin; when the operating capacity of the strongly basic anion exchange resin is attained, the brine flow will be diverted, possibly to another bed of active resin, for a duration necessary to remove the mercury from the strongly basic anion exchange resin by flushing with an aqueous sulfide solution. The effluent from this flushing action may then be carried to a separate location for removal of metallic mercury by separating the mercury sulfide from the aqueous sulfide solution and recovering the metallic mercury by well known chemical reduction or cinnabarian retorting techniques. If desired, the strongly basic anion exchange resin may be washed after the sulfide flushing with a suitable aqueous chloride solution such as sodium chloride, potassium chloride or the like as a revitalization technique. This particular process lends itself uniquely to a continuous reaction process and all the benefits derived therefrom.

The temperature and pressure at which the process is carried out is not critical, nor does solution basicity or acidity materially affect the efficiency thereof. The exchange sequence, the flushing step, and all of the other attendant procedures may be carried out at any temperature pressure and pH range desired. Generally, those temperatures pressures and hydrogen ion concentrations utilized will be in conformance with the electrolytic cell operations.

The following example is given to illustrate the mercury recovery process contemplated by the present invention, but is not to be construed as limiting the invention thereto.

*Example 1*

About 50 milliliters of a strongly basic anion exchange resin, having the previously mentioned type I configuration, with a negatively charged chloride ion attached, thereto, were introduced into a 50 milliliter glass burette and supported by a glass wool mesh. A 0.2 N saline solution of mercuric chloride was allowed to pass by gravity flow through the strongly basic anion exchange resin bed. Three hundred and fifty milliliters of the filtered effluent were recovered at the bottom of the burette before mercury salts were detected. A continuous treatment with hydrogen sulfide gas provided the means for detecting mercury in the effluent. When mercury was detected in the effluent, the flow was discontinued and the burette allowed to completely drain. The mercury was recovered from the strongly basic anion exchange resin by washing or regenerating from the exchange resin by utilizing 300 milliliters of 2 N aqueous sodium sulfide. Room temperatures and atmospheric pressures were utilized.

The identical process, as described above, was repeatedly carried out utilizing the same strongly basic anion exchange resin without the slightest indication of depreciative effect. The reactive life of the strongly basic anion exchange resin is essentially unlimited, when subjected repeatedly to the mercury containing brine and to the described sulfide wash.

Further, other strongly basic anion exchange resins, such as those described in the foregoing as resinous, insoluble quaternary ammonium compositions prepared by the amination of a haloalkylated copolymer with a tertiary amine as well as quaternary ammonium polymeric compositions containing one or more quaternary ammonium substituents per molecular unit, are employed to obtain substantially identical results as those obtained in Example 1 above.

Various modifications may be made in the present invention without departing from the spirit or scope thereof, and it is to be understood that we limit ourselves only as defined in the appended claims. Thus, the invention has been described with respect to electrolytic mercury cell brine effluent but is applicable as well to the recovery of mercury from similar brines containing dissolved mercury salts, regardless of the source of the brine or of its mercury content.

We claim:

1. A process for the recovery of mercury salts from a brine having mercury salts dissolved therein which comprises passing such brine through a strongly basic insoluble anion exchange resin, and washing the mercury salts from the strongly basic anion exchange resin with an excess of an aqueous sulfide solution.

2. A process for the recovery of dissolved mercury salts in a brine effluent from mercury cathode electrolytic cell which comprises passing such brine effluent, with mercury salts dissolved therein, through a strongly basic insoluble anion exchange resin, and washing said mercury salts from the strongly basic anion exchange resin with an excess of an aqueous sulfide solution.

3. A process for the recovery of dissolved mercury salts in brine effluent from mercury cathode electrolytic cells which comprises passing said brine effluent, with mercury salts dissolved therein, through a strongly basic insoluble anion exchange resin and washing said mercury salts from the strongly basic anion exchange resin with at least a 100% stoichiometric excess of an equeous sulfide solution.

References Cited in the file of this patent

UNITED STATES PATENTS 2,860,952    Bergeron _____ Nov. 18, 1958

OTHER REFERENCES

Chemical Abstracts, 1954, vol. 48, pp. 2441–2442.